Patented Aug. 11, 1931

1,818,878

UNITED STATES PATENT OFFICE

ADAM ARBOGAST, OF BASEL, SWITZERLAND, ASSIGNOR TO SOCIETY OF CHEMICAL INDUSTRY IN BASLE, OF BASEL, SWITZERLAND

DYESTUFF PREPARATION AND PROCESS OF MAKING SAME

No Drawing. Application filed June 15, 1928, Serial No. 285,792, and in Switzerland June 24, 1927.

The present invention relates to new dyestuff preparations, particularly suitable for producing fast tints on the fibre. It comprises the new preparations, the process of making same, and the material that has been dyed with the new products.

The symmetrical 1:2- and 2:1-napthhio-indigoes are described in literature as brown vat-dyestuffs. Nothing more concerning these compounds, which are not commercial products, is known. When these dyestuffs are made it is found that the 1:2-napththio-indigo is a red-brown and the 2:-napthhio-indigo is more yellow brown.

This invention is based on the observation that when these dyestuffs are mixed either by mechanically mixing them or by oxidizing the mixed corresponding leucocompounds or ester salts of the leuco-compounds, or a mixture of the corresponding hydroxy-thionaphthene derivatives—which may be carried out either in substance or on the fibre—new products are obtained which dye fibres brown tints, the fullness and brightness of which essentially exceeds those which could be expected from the dyeings of the components. The effect is already perceptible when one of the dyestuffs contains only a few percents of the other.

The same result is obtained when the vats of the separate dyestuffs are mixed or mixtures of the leuco-compounds or of the ester salts of the leuco-compounds of the respective dyestuffs are used. Obviously the new products themselves can be converted into leuco-compounds or ester salts thereof and then brought into use.

The following examples illustrate the invention, the parts being by weight:—

Example 1

30 parts of 1:2-napththio-indigo are mixed with 70 parts of 2:1-napththio-indigo in a suitable apparatus. The product dyes cotton in a vat red-brown tints which are similar to the tints produced by pure 1:2-napththio-indigo but are considerably brighter and fuller. Instead of a mixture made mechanically there may be used one which is prepared in a chemical manner, for instance by oxidizing the mixtures of the leuco-compounds or the corresponding hydroxy-thionaphthene-derivatives.

Similar products are obtained if the proportion in which the components are mixed is varied in one direction or the other. The dyeings can be discharged by hydrosulfite.

Example 2

To a mixture of 1100 parts of chlorobenzene and 535 parts of dimethylaniline are added at 0–2° C. 245 parts of chlorosulfonic acid. Into this mixture there are introduced, while maintaining an atmosphere of carbon dioxide and stirring at a temperature of 0° C., 398 parts of the dry leuco-compound of a mixture of equal weights of 1:− and 2:1-napththio-indigo corresponding probably with the formulæ.

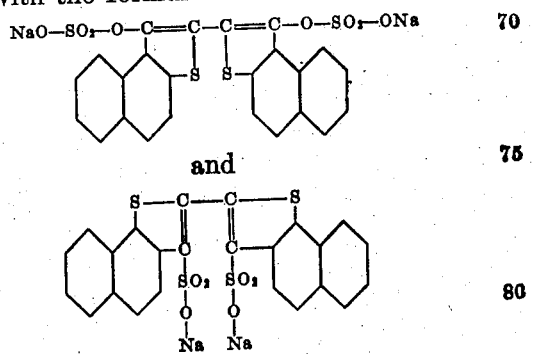

Stirring is continued for some time at 0–5° C., the temperature is allowed to rise to that of the room and the whole is then heated in the course of several hours to 55–60° C. The product is made alkaline with caustic soda solution and distilled in steam. The contents of the still are then concentrated in a vacuum, common salt is added to the liquid and the sodium salt of the new product thus obtained is filtered and dried.

Example 3

A mixture of 600 grams of 2:1-napththio-indigo and 400 grams of 1:2-napththio-indigo is made into a paste with 1 kilo of a highly sulfonated castor oil and 100 litres of water at 70–80° C. are added; 3 litres of caustic soda solution of 36° Bé. are then added and 2.5 kilos of hydrosulfite conc. powder are scattered into the liquid. Vatting is completed after 10 minutes.

Instead of using the dyestuff in the form of a powder it may be vatted in the form of a paste. For the highly sulfonated castor oil may be substituted another wetting agent, such as a less highly sulfonated castor oil or sulfite cellulose waste liquor freed from lime. The dyeing vat is now made up with 1000 litres of water and 1000–250 c. c. of caustic soda solution of 36° Bé., and the whole is heated to 60° C., separated lime is removed if necessary and hydrosulfite conc. powder added according to the depth of tint required. In general, there is used for light tints 1 kilo, for medium tints 0.5 kilo and for dark tints 0.2 kilo of hydrosulfite conc. powder per 1000 litres of vat. The stock-vat and the dye-vat are now united, the well boiled and wetted cotton is introduced and dyeing conducted for ½ hour at 60° C. For exhausting the dye-bath there are added after ¼ hour dyeing 10 to 30 grams of common salt dissolved in water per litre of vat. After the dyeing the goods are wrung out, suspended for oxidation, washed, soured and developed by boiling with 3 grams of soap and 1 gram of calcined sodium carbonate per litre of water for ½ hour.

A like prescription serves for applying the product in piece-dyeing.

Example 4

The stock-vat is prepared as described in Example 3, except that in this case half the quantity of a highly sulfonated castor oil 2 litres of caustic soda solution of 36° Bé. and 1.5 kilo of hydrosulfite conc. powder are used.

To the dye-bath, heated to 50–60° C., are added 500 grams of glue (swollen and freshly dissolved) or another protective colloid, 500 cc. of ammonia of 20 per cent. strength and 300 grams of hydrosulfite conc. powder per 1000 litres of water. (For light tints up to 1 per cent. there are also added 500 cc. of caustic soda solution of 36° Bé. and 200 grams of hydrosulfite conc. powder.) The dissolved dyestuff is then added through a fine sieve and the whole is stirred; the dry or wetted wool is entered and dyeing is continued for ½ hour at 50–60° C. The goods are then wrung out, oxidized in the air, washed and developed with 1 to 2 cc. of sulfuric acid of 66° Bé. per litre of water for ½ hour at 90° C.

If silk is to be dyed instead of wool the operation is conducted according to Example 3 but without the addition of common salt.

Example 5

For printing the usual method for Ciba dyes is adopted with a printing colour which is feebly alkaline or contains only potash: for example—

```
100 grams of the product described in the first paragraph
    of Example 1 in the form of a paste of 20 per cent.
    strength
600 grams of potash thickening
 30 grams of caustic soda solution of 36° Bé.
 20 grams of hydrosulfite conc. powder are heated to-
    gether at 50 to 60° C. until reduction has occurred
    and there are added
 50 grams of the sodium salt of formaldehydesulfoxylic
    acid and
200 grams of water,
———
  1 kilo,
``` or

```
100 grams of the product of the first paragraph of Ex-
    ample 1 in the form of a paste of 20 per cent.
    strength
600 grams of potash thickening
200 grams of water
 60 grams of the sodium salt of formaldehydesulfoxylic
    acid
 40 grams of water
———
  1 kilo.
```

After printing, the goods are aged in the usual manner in the Mather-Platt apparatus and developed by soap at the boil.

For printing silk this prescription serves with omission of caustic soda solution and the same for printing wool with the variation that the development is by addition of hydrogen peroxide instead of by boiling soap solution.

Example 6

The goods are printed with the following printing colour—

```
 40 grams of the product of Example 2
340 grams of water
500 grams of tragacanth thickening
5-20 grams of sodium nitrite
100 grams of water
———
  1 kilo
```

The goods are then dried, developed in a warm sulfuric acid bath which contains about 35 cc. of sulfuric acid of 66° Bé. per litre, washed, neutralized and soaped.

Example 7

The goods are printed with the following printing colour:—

```
 40 grams of a mixture of equal parts of the leuco-ester
    salts of 1:2- and 2:1-napththio-indigo
330 grams of water
450 grams of neutral starch tragacanth thickening
 50 grams of sodium chlorate solution 1:3
 30 grams of ammonium sulfocyanide solution 1:1
100 grams of ammonium vanadate 1:1000
———
  1 kilo.
```

They are then dried, treated in the Mather-Platt apparatus, washed and soaped.

The leuco-ester salts also dye animal fibre in an acid bath and may subsequently be brought to full development in an oxidizing bath.

What we claim is:—

1. As new products dyestuff preparations, consisting in a mixture of 2:1- and 1:2-napththio-indigoes to obtain a coloring matter yielding on the fibres brown tints of greater fullness and brightness than those which could be expected from the mixture of the components.

2. In the preparation of dyestuff preparations, the process consisting in mixing symmetrical 1:2-napththio-indigo with symmetrical 2:1-napththio-indigo by oxidizing together a mixture of the leuco-compounds of said dyestuffs.

3. In the preparation of dyestuff preparations, the process consisting in mixing symmetrical 1:2-napththio-indigo with symmetrical 2:1-napththio-indigo by oxidizing together a mixture of the leuco-compounds of said dyestuffs on textile material.

In witness whereof I have hereunto signed my name this 5th day of June, 1928.

ADAM ARBOGAST.